(12) United States Patent
Nanba et al.

(10) Patent No.: US 9,976,022 B2
(45) Date of Patent: May 22, 2018

(54) POLYTETRAFLUOROETHYLENE AQUEOUS DISPERSION

(71) Applicant: DAIKIN INDUSTRIES, LTD., Osaka-Shi, Osaka (JP)

(72) Inventors: Yoshinori Nanba, Osaka (JP); Dai Fukami, Osaka (JP); Takuya Yamabe, Osaka (JP); Taketo Kato, Osaka (JP); Makoto Ono, Osaka (JP); Takahiro Taira, Osaka (JP); Hirotoshi Yoshida, Osaka (JP); Taku Yamanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days. days.

(21) Appl. No.: 15/316,031

(22) PCT Filed: Jun. 4, 2015

(86) PCT No.: PCT/JP2015/066210
§ 371 (c)(1),
(2) Date: Dec. 2, 2016

(87) PCT Pub. No.: WO2015/186793
PCT Pub. Date: Dec. 10, 2015

(65) Prior Publication Data
US 2017/0107368 A1 Apr. 20, 2017

(30) Foreign Application Priority Data
Jun. 4, 2014 (JP) .................... 2014-116291

(51) Int. Cl.
C08L 27/18 (2006.01)
C08F 114/26 (2006.01)

(52) U.S. Cl.
CPC ........... C08L 27/18 (2013.01); C08L 2201/54 (2013.01)

(58) Field of Classification Search
USPC ........................................... 526/248; 521/65
See application file for complete search history.

(56) References Cited

U.S. PATENT DOCUMENTS

| 6,046,271 | A | 4/2000 | Wu et al. | |
|---|---|---|---|---|
| 6,774,164 | B2 | 8/2004 | Lyons et al. | |
| 7,696,268 | B2 * | 4/2010 | Tsuda | C08F 6/16 524/156 |
| 2002/0037985 | A1 * | 3/2002 | Lyons | C08F 14/18 526/247 |
| 2005/0038177 | A1 * | 2/2005 | Hoshikawa | C08F 6/16 524/544 |
| 2007/0135558 | A1 * | 6/2007 | Tsuda | C08F 6/16 524/544 |
| 2008/0200571 | A1 | 8/2008 | Higuchi et al. | |
| 2009/0253854 | A1 | 10/2009 | Xu et al. | |
| 2015/0299341 | A1 * | 10/2015 | Nanba | C08F 14/18 524/805 |
| 2015/0322237 | A1 * | 11/2015 | Nanba | C08F 2/44 524/546 |
| 2017/0096504 | A1 | 4/2017 | Nanba et al. | |
| 2017/0107309 | A1 | 4/2017 | Nanba et al. | |

FOREIGN PATENT DOCUMENTS

| CN | 104812780 A | 7/2015 |
|---|---|---|
| CN | 104884476 A | 9/2015 |
| EP | 0 248 446 A2 | 12/1987 |
| EP | 2918613 A1 | 9/2015 |
| EP | 2927247 A1 | 10/2015 |
| JP | 49-27587 A | 3/1974 |
| JP | 63-81104 A | 4/1988 |
| JP | 10-513497 A | 12/1998 |
| JP | 2001-040043 A * | 2/2001 |
| JP | 2003-500495 A | 1/2003 |
| JP | 2009-155558 A | 7/2009 |
| JP | 2010-180364 A | 8/2010 |
| JP | 2012-513530 A | 6/2012 |
| JP | 2012-513532 A | 6/2012 |
| WO | 96/24625 A2 | 8/1996 |

(Continued)

OTHER PUBLICATIONS

International Preliminary Report on Patentability dated Dec. 6, 2016 from the International Bureau in counterpart application No. PCT/JP2015/066211.
International Preliminary Report on Patentability dated Dec. 6, 2016 from the International Bureau in counterpart application No. PCT/JP2015/066237.
International Preliminary Report on Patentability dated Dec. 6, 2016 from the International Bureau in counterpart application No. PCT/JP2015/066210.
International Search Report for PCT/JP2015/066210 dated Sep. 8, 2015.
International Search Report for PCT/JP2015/066211 dated Jun. 30, 2015.
International Search Report for PCT/JP2015/066237 dated Sep. 8, 2015.
Office Action dated Mar. 1, 2017 issued in U.S. Appl. No. 15/316,032.
Communication dated Nov. 22, 2017 issued by the European Patent Office in counterpart application No. 15803131.0.

(Continued)

Primary Examiner — Mark Kaucher
Assistant Examiner — Henry Hu
(74) Attorney, Agent, or Firm — Sughrue Mion, PLLC

(57) ABSTRACT

The present invention provides a polytetrafluoroethylene aqueous dispersion containing high-molecular-weight, significantly small polytetrafluoroethylene particles and having excellent dispersion stability. The present invention relates to an aqueous dispersion containing polytetrafluoroethylene particles containing a tetrafluoroethylene unit alone or a tetrafluoroethylene unit and a modifying monomer unit based on a modifying monomer copolymerizable with the tetrafluoroethylene. The polytetrafluoroethylene particles have a volume average particle size of not smaller than 0.1 nm but smaller than 20 nm, a melt flow rate of not lower than 0 g/10 min but lower than 80 g/10 min determined at 380° C. and 5 kg load, a melting point of 324° C. to 360° C., and an initial pyrolysis temperature of not lower than 400° C.

4 Claims, No Drawings

(56) References Cited

FOREIGN PATENT DOCUMENTS

| WO | 00/71590 A1 | | 11/2000 |
|---|---|---|---|
| WO | 2005/042593 A1 | | 5/2005 |
| WO | WO -2005/042593 A1 | * | 5/2005 |
| WO | 2007/046345 A1 | | 4/2007 |
| WO | 2010/075359 A1 | | 7/2010 |
| WO | 2010/075494 A1 | | 7/2010 |

OTHER PUBLICATIONS

Communication dated Oct. 26, 2017, from European Patent Office in counterpart application No. 15803136.9.
Office Action dated May 10, 2017, issued in prosecution of U.S. Appl. No. 15/316,024.
Communication dated Aug. 3, 2017, from the European Patent Office issued in EP Appln. No. 15802859.7.
Communication dated Feb. 9, 2018 from the United States Patent and Trademark Office in counterpart U.S. Appl. No. 15/316,024.

* cited by examiner

POLYTETRAFLUOROETHYLENE AQUEOUS DISPERSION

CROSS REFERENCE TO RELATED APPLICATIONS

This application is a National Stage of International Application No. PCT/JP2015/066210 filed Jun. 4, 2015, claiming priority based on Japanese Patent Application No. 2014-116291 filed Jun. 4, 2014, the contents of all of which are incorporated herein by reference in their entirety.

TECHNICAL FIELD

The present invention relates to polytetrafluoroethylene aqueous dispersions.

BACKGROUND ART

Fluororesin aqueous dispersions are usually produced by emulsion polymerizing a fluoromonomer in the presence of a fluorosurfactant. The fluorosurfactant conventionally used is a long-chain fluorosurfactant such as perfluorooctanoic acid or a salt thereof.

Patent Literature 1 discloses that ammonium perfluorooctanoate is a substance which does not exist in the nature and is difficult to decompose, so that restraint of exhaustion thereof is proposed from the viewpoint of environmental preservation, and also discloses that this substance is highly bioaccumulative.

Patent Literature 1 proposes a polytetrafluoroethylene aqueous emulsion obtained by emulsion polymerizing tetrafluoroethylene alone or with a monomer copolymerizable therewith in an aqueous medium using a fluorine-containing emulsifier represented by the formula:

$$XCF_2CF_2(O)_mCF_2CF_2OCF_2COOA$$

(wherein X is a hydrogen atom or a fluorine atom; A is a hydrogen atom, an alkali metal, or $NH_4$; and m is an integer of 0 or 1) in an amount of 1,500 to 20,000 ppm relative to the final polytetrafluoroethylene yield.

Patent Literature 2 discloses a low molecular weight polytetrafluoroethylene aqueous dispersion produced by a method for producing a low molecular weight polytetrafluoroethylene. The method includes emulsion polymerizing tetrafluoroethylene alone or tetrafluoroethylene and a modifying monomer copolymerizable with the tetrafluoroethylene in an aqueous medium in the presence of a reactive compound and a chain-transfer agent, wherein the reactive compound has a hydrophilic group and a functional group reactive in radical polymerization, and is used in an amount corresponding to more than 10 ppm relative to the aqueous medium.

Patent Literature 3 discloses an aqueous dispersion of fluoropolymer particles produced by a method for producing an aqueous dispersion of fluoropolymer particles. The method includes the steps of: preparing dispersed particles of a fluorinated ionomer in an aqueous polymerization medium; and polymerizing at least one fluorinated monomer in the presence of the dispersed particles of the fluorinated ionomer and an initiator in the aqueous polymerization medium to form an aqueous dispersion of fluoropolymer particles.

CITATION LIST

Patent Literature

Patent Literature 1: WO 2007/046345
Patent Literature 2: JP 2010-180364 A
Patent Literature 3: JP 2012-513530 T

SUMMARY OF INVENTION

Technical Problem

In conventional techniques, emulsion polymerization of a fluoromonomer using a fluorosurfactant that is not a long-chain fluorosurfactant tends to provide fluororesin particles having a large particle size. Further, the resulting dispersion stability tends to be poor, causing sticking of the polymer to a stirring blade during polymerization. In particular, it is not easy to produce a polytetrafluoroethylene aqueous dispersion having a sufficiently small particle size and excellent dispersion stability. In fact, no polytetrafluoroethylene aqueous dispersion has been known which contains polytetrafluoroethylene particles significantly smaller than a predetermined scale and is excellent in dispersion stability.

Although polytetrafluoroethylene particles having a relatively small particle size have been known, no aqueous dispersion has been known which contains polytetrafluoroethylene particles which have a high molecular weight and are significantly smaller than a predetermined scale.

The present invention is devised in view of the above situation, and aims to provide a polytetrafluoroethylene aqueous dispersion containing high-molecular-weight, significantly small polytetrafluoroethylene particles and having excellent dispersion stability.

Solution to Problem

The inventors performed various studies to succeed, production of a polytetrafluoroethylene aqueous dispersion containing high-molecular-weight, significantly small polytetrafluoroethylene particles and having excellent dispersion stability, completing the present invention.

Specifically, the present invention relates to a polytetrafluoroethylene aqueous dispersion containing polytetrafluoroethylene particles containing a tetrafluoroethylene unit alone or a tetrafluoroethylene unit and a modifying monomer unit based on a modifying monomer copolymerizable with the tetrafluoroethylene, the polytetrafluoroethylene particles having a volume average particle size of not smaller than 0.1 nm but smaller than 20 nm, a melt flow rate of not lower than 0 g/10 min but lower than 80 g/10 min determined at a temperature of 380° C. and 5 kg load, a melting point of 324° C. to 360° C., and an initial pyrolysis temperature of not lower than 400° C.

The polytetrafluoroethylene aqueous dispersion preferably further contains a fluorosurfactant having Log POW of 3.4 or lower in an amount corresponding to 4,600 to 500,000 ppm of the aqueous dispersion.

The polytetrafluoroethylene aqueous dispersion preferably further contains, as the fluorosurfactant, a fluorine-containing compound represented by the following formula (1):

$$X-(CF_2)_{m1}-Y \qquad (1)$$

wherein X is H or F; m1 is an integer of 3 to 5; and Y is $-SO_3M$, $-SO_4M$, $-SO_3R$, $-SO_4R$, $-COOM$, $-PO_3M_2$, or $-PO_4M_2$ where M is H, $NH_4$, or an alkali metal and R is a C1-C12 alkyl group.

The polytetrafluoroethylene aqueous dispersion is preferably free from a fluorine-containing compound represented by the following formula (2):

$$X-(CF_2)_{m2}-Y \qquad (2)$$

wherein X is H or F; m2 is an integer of 6 or greater; and Y is —SO₃M, —SO₄M, —SO₃R, —SO₄R, —COOM, —PO₃M₂, or —PO₄M₂, where M is H, NH₄, or an alkali metal and R is a C1-C12 alkyl group.

Advantageous Effects of Invention

Since the polytetrafluoroethylene aqueous dispersion of the present invention contains significantly small polytetrafluoroethylene particles and is excellent in dispersion stability, it is effectively stable against mechanical shearing force so that the particles are less likely to coagulate, and effectively has good precipitation stability. Further, since the polytetrafluoroethylene particles have a small particle size and the polytetrafluoroethylene has a high molecular weight, the mechanical strength is less likely to be impaired.

DESCRIPTION OF EMBODIMENTS

The present invention is described in detail below.

The polytetrafluoroethylene aqueous dispersion of the present invention contains polytetrafluoroethylene (PTFE) particles containing a tetrafluoroethylene (TFE) unit alone or a tetrafluoroethylene unit and a modifying monomer unit based on a modifying monomer copolymerizable with the tetrafluoroethylene.

The PTFE may be a homo-PTFE or a modified PTFE. The modified PTFE includes a TFE unit and a modifying monomer unit based on a modifying monomer copolymerizable with TFE. The PTFE may be a non-melt-fabricable, fibrillatable high molecular weight PTFE or a melt-fabricable, non-fibrillatable low molecular weight PTFE.

The term "melt-fabricable" herein means that a polymer can be molten and then fabricated using a conventional processing device such as an extruder or an injection molding device.

The modifying monomer may be any monomer copolymerizable with TFE. Examples thereof include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; perfluoroalkylethylenes; ethylene; and nitrile group-containing fluorine-containing vinyl ethers. These modifying monomers may be used alone or in combination.

Any perfluorovinyl ether may be used, and examples thereof include unsaturated perfluoro compounds represented by the following formula (6):

$$CF_2=CF—ORf^8 \qquad (6)$$

wherein $Rf^8$ is a perfluoro organic group. The term "perfluoro organic group" herein means an organic group in which all the hydrogen atoms bonded to the carbon atoms are replaced by fluorine atoms. The perfluoro organic group may have ether oxygen.

Examples of the perfluorovinyl ether include perfluoro (alkyl vinyl ethers) (PAVE) represented by the formula (6) wherein $Rf^8$ is a C1-C10 perfluoroalkyl group. The perfluoroalkyl group preferably has 1 to 5 carbon atoms.

The perfluoroalkyl group in the PAVE may be a perfluoromethyl group, a perfluoroethyl group, a perfluoropropyl group, a perfluorobutyl group, a perfluoropentyl group, or a perfluorohexyl group, for example. Preferred is perfluoromethyl vinyl ether (PMVE) in which the perfluoroalkyl group is a perfluoromethyl group or perfluoropropyl vinyl ether (PPVE) in which the perfluoroalkyl group is a perfluoropropyl group.

Examples of the perfluorovinyl ether further include those represented by the formula (6) wherein $Rf^8$ is a C4-C9 perfluoro(alkoxyalkyl) group; those represented by the formula (6) wherein $Rf^8$ is a group represented by the following formula:

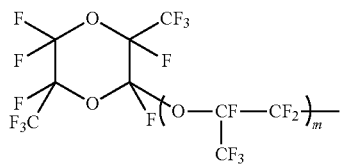

where m is 0 or an integer of 1 to 4; and those represented by the formula (6) wherein $Rf^8$ is a group represented by the following formula:

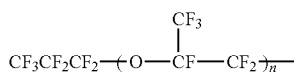

where n is an integer of 1 to 4.

Any perfluoroalkyl ethylene may be used, and examples thereof include perfluorobutyl ethylene (PFBE), perfluorohexyl ethylene (PFHE), and perfluorooctyl ethylene (PFOE).

The nitrile group-containing fluorine-containing vinyl ether is more preferably a fluorine-containing vinyl ether represented by $CF_2=CFORf^9CN$ (wherein $Rf^9$ represents a C2-C7 alkylene group in which an oxygen atom may optionally be inserted between two carbon atoms). Examples of the nitryl group-containing fluorine-containing vinyl ether include perfluoro[3-(1-methyl-2-vinyloxyethoxy)propionitrile] (CNVE).

The modifying monomer in the modified PTFE is preferably at least one selected from the group consisting of HFP, CTFE, VDF, PMVE, PPVE, PFBE, PFHE, CNVE, and ethylene. It is more preferably at least one monomer selected from the group consisting of PMVE, PPVE, PFHE, CNVE, HFP, and CTFE.

The modified PTFE preferably includes 0.001 to 2 mol %, more preferably 0.001 to 1 mol %, still more preferably 0.001 to 0.5 mol %, particularly preferably 0.001 to 0.03 mol %, of the modifying monomer unit.

The amount of each monomer constituting the PTFE herein can be calculated by appropriate combination of NMR, FT-IR, elemental analysis, and X-ray fluorescence analysis in accordance with the type of the monomer.

The PTFE particles have a volume average particle size of not smaller than 0.1 nm but smaller than 20 nm. The particles having a volume average particle size within the above range can be significantly finely dispersed in a matrix material, exerting the effects of further improving the smoothness and the texture of the coating surface. Use of the PTFE particles having a volume average particle size within the above range in multistage polymerization can provide an aqueous dispersion which contains fluororesin particles having a significantly small particle size. The particles having too large a volume average particle size may lead to an aqueous dispersion which contains fluororesin particles having a significantly large particle size, impairing the reaction stability and generating unexpected coagulum during the polymerization in some cases. Use of PTFE particles having too large a volume average particle size in multistage polymerization fails to provide an aqueous dispersion which contains fluororesin particles having a significantly small particle size and which is excellent in dispersion stability. PTFE particles having a volume average particle size of smaller than 0.1 nm are not easy to produce. The volume average particle size of the PTFE particles is preferably not smaller than 0.5 nm, more preferably not smaller than 1.0 nm, while preferably not greater than 15 nm, more preferably not greater than 10 nm, still more preferably smaller than 5 nm, particularly preferably smaller than 3 nm.

The volume average particle size is determined by dynamic light scattering. In the determination, a PTFE aqueous dispersion with a PTFE solid content of 1.0 mass % is prepared. The value is determined using ELSZ-1000S (Otsuka Electronics Co., Ltd.) at 25° C. with 70 accumulations. The applied refractive index of the solvent (water) is 1.3328 and the viscosity of the solvent (water) is 0.8878 mPa·s. The volume average particle size is the average particle size of the particles dispersed in the state of primary particles.

The PTFE has a melt flow rate (MFR) of not lower than 0 g/10 min but lower than 80 g/10 min. The MFR is preferably not higher than 30 g/10 min, more preferably not higher than 10 g/10 min, still more preferably not higher than 5 g/10 min.

A low MFR means a high molecular weight of PTFE. The aqueous dispersion of the present invention is characterized by containing PTFE particles having a high molecular weight as well as a significantly small particle size.

The MFR is a value obtained as the mass (g/10 min) of the polymer flowed out of a nozzle (inner diameter: 2 mm, length: 8 mm) per 10 minutes using a melt indexer (Yasuda Seiki Seisakusho Ltd.) in conformity with ASTM D1238 at 380° C. and 5 kg load.

The PTFE has a melting point of 324° C. to 360° C. The melting point is preferably 350° C. or lower, more preferably 348° C. or lower.

The melting point herein is a temperature corresponding to the local maximum on a heat-of-fusion curve obtained by heating 3 mg of a sample having no history of being heated up to 300° C. or higher using a differential scanning calorimeter (DSC) at a temperature-increasing rate of 10° C./min.

The PTFE has an initial pyrolysis temperature of 400° C. or higher. The initial pyrolysis temperature is preferably 420° C. or higher, more preferably 430° C. or higher.

The initial pyrolysis temperature herein is a temperature at which the amount of a sample is reduced by 1 mass % when 10 mg of the sample is heated from room temperature at a temperature-increasing rate of 10° C./min using a thermogravimetric-differential thermal analysis (TG-DTA) device (trade name: TG/DTA6200, Seiko Instruments Inc.).

The PTFE is preferably not a fluorinated ionomer because it is difficult to apply a fluorinated ionomer to the use of the PTFE aqueous dispersion to be mentioned later.

The PTFE preferably has an equivalent weight (EW) of not less than 6,000. The equivalent weight (EW) is a dry weight per equivalent of an ion-exchange group. A high equivalent weight (EW) of the PTFE indicates that the monomers constituting the PTFE hardly include an ionomer. Even though the PTFE hardly includes an ionomer, it has a significantly small volume average particle size. The equivalent weight (EW) is more preferably not less than 10,000. The upper limit may be any value, and is preferably not more than 50,000,000.

The method for producing an aqueous dispersion of fluoropolymer particles disclosed in Patent Literature 3 essentially includes forming dispersed particles of a fluorinated ionomer in the first stage. Thus, the finally produced fluoropolymer has poor heat resistance, and bubbles may be generated and staining may occur when the resulting fluoropolymer is heated. Since the equivalent weight (EW) of the PTFE in the polytetrafluoroethylene aqueous dispersion of the present invention is not less than 6,000, the PTFE particles and the fine powder or molded articles obtained therefrom have excellent heat resistance.

The equivalent weight can be determined as follows.

The PTFE in the aqueous dispersion containing PTFE particles is coagulated using hydrochloric acid or nitric acid. The coagulated PTFE is washed with pure water until the solution after the washing becomes neutral, and then heat-dried in vacuo at 110° C. or lower until the moisture is removed. Then, about 0.3 g of the dried PTFE is immersed in 30 mL of a saturated NaCl aqueous solution at 25° C. and left stirring for 30 minutes. Next, the protons in the saturated NaCl aqueous solution are subjected to neutralization titration using a 0.01 N solution of sodium hydroxide in water with a phenolphthalein indicator. The neutralization provides PTFE including a sodium ion as the counterion for the ion-exchange group. This PTFE is rinsed with pure water, and then vacuum-dried and weighed. The equivalent weight EW (g/eq) is then determined by the following formula:

$$EW=(W/M)-22$$

wherein M (mmol) represents the amount of the sodium hydroxide used for neutralization and W (mg) represents the mass of the PTFE including a sodium ion as the counterion for the ion-exchange group.

The polytetrafluoroethylene aqueous dispersion of the present invention contains the PTFE particles dispersed in an aqueous medium. The aqueous medium may be any liquid that contains water, and it may be one containing water and, for example, any of fluorine-free organic solvents such as alcohols, ethers, and ketones, and/or fluorinated organic solvents having a boiling point of 40° C. or lower. The aqueous medium is preferably water.

The polytetrafluoroethylene aqueous dispersion of the present invention may contain a fluorosurfactant having Log POW of 3.4 or lower in an amount corresponding to 4,600 to 500,000 ppm of the aqueous medium. Too small an amount of the fluorosurfactant may cause poor dispersion stability, while too large an amount thereof may fail to give the effects corresponding to the amount, causing economic disadvantages. The amount of the fluorosurfactant is preferably 6,000 ppm or more, more preferably 8,000 ppm or more, still more preferably 18,000 ppm or more, particularly preferably 20,000 ppm or more, while preferably 400,000 ppm or less, more preferably 300,000 ppm or less.

Since the polytetrafluoroethylene aqueous dispersion of the present invention contains a fluorosurfactant having Log POW of 3.4 or lower, it has excellent dispersion stability even without a conventional long-chain fluorosurfactant.

Log POW is a 1-octanol/water partition coefficient which is represented by Log P (wherein P is the ratio between the concentration of the fluorosurfactant in octanol and that in water in a phase-separated octanol/water (1:1) liquid mixture containing the fluorosurfactant). Log POW is preferably 1.5 or higher. For easy removal of the surfactant from the PTFE, Log POW is preferably 3.0 or lower, more preferably 2.8 or lower.

Log POW is determined as follows. Specifically, HPLC is performed on standard substances (heptanoic acid, octanoic acid, nonanoic acid, and decanoic acid) each having a known octanol/water partition coefficient using TOSOH ODS-120T (φ4.6 mm×250 mm, Tosoh Corp.) as a column and acetonitrile/0.6 mass % HClO$_4$ aqueous solution (=1/1 (vol/vol %)) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on this calibration curve, Log POW is calculated from the elution time of the sample liquid in HPLC.

The fluorosurfactant having Log POW of 3.4 or lower is preferably an anionic fluorosurfactant, and examples thereof include those described in US 2007/0015864, US 2007/0015865, US 2007/0015866, US 2007/0276103, US 2007/0117914, US 2007/142541, US 2008/0015319, U.S. Pat. No. 3,250,808, U.S. Pat. No. 3,271,341, JP 2003-119204 A, WO 2005/042593, WO 2008/060461, WO 2007/046377, WO 2007/119526, WO 2007/046482, and WO 2007/046345.

The fluorosurfactant having Log POW of 3.4 or lower is preferably an anion surfactant.

The anion surfactant is preferably a carboxylic acid surfactant or a sulfonic acid surfactant, for example. Examples of these surfactants include those containing a perfluorocarboxylic acid (I) represented by the following formula (I), a ω-H perfluorocarboxylic acid (II) represented by the following formula (II), a perfluoropolyether carboxylic acid (III) represented by the following formula (III), a perfluoroalkyl alkylene carboxylic acid (IV) represented by the following formula (IV), a perfluoroalkoxy fluorocarboxylic acid (V) represented by the following formula (V), a perfluoroalkyl sulfonic acid (VI) represented by the following formula (VI), and/or a perfluoroalkyl alkylene sulfonic acid (VII) represented by the following formula (VII).

The perfluorocarboxylic acid (I) is represented by the following formula (I):

$$F(CF_2)_{n1}COOM \quad (I)$$

wherein n1 is an integer of 3 to 6; and M is H, NH$_4$, or an alkali metal element.

In the formula (I), the lower limit of n1 is preferably 4 in view of the stability of the polymerization reaction. In order to make the fluorosurfactant less likely to remain during processing of the resulting PTFE aqueous dispersion, M is preferably NH$_4$.

For example, the perfluorocarboxylic acid (I) is preferably F(CF$_2$)$_6$COOM, F(CF$_2$)$_5$COOM, or F(CF$_2$)$_4$COOM, where M is defined as mentioned above.

The ω-H perfluorocarboxylic acid (II) is represented by the following formula (II):

$$H(CF_2)_{n2}COOM \quad (II)$$

wherein n2 is an integer of 4 to 8; and M is defined as mentioned above.

In the formula (II), the upper limit of n2 is preferably 6 in view of the stability in the polymerization reaction. In order to make the fluorosurfactant less likely to remain during processing of the resulting PTFE aqueous dispersion, M is preferably NH$_4$.

For example, the ω-H perfluorocarboxylic acid (II) is preferably H(CF$_2$)$_8$COOM, H(CF$_2$)$_7$COOM, H(CF$_2$)$_6$COOM, H(CF$_2$)$_5$COOM, or H(CF$_2$)$_4$COOM, where M is defined as mentioned above.

The perfluoropolyether carboxylic acid (III) is represented by the following formula (III):

$$Rf^1\text{—}O\text{—}(CF(CF_3)CF_2O)_{n3}CF(CF_3)COOM \quad (III)$$

wherein Rf$^1$ is a C1-C5 perfluoroalkyl group; n3 is an integer of 0 to 3; and M is defined as mentioned above.

In the formula (III), Rf$^1$ is preferably a perfluoroalkyl group having four or less carbon atoms in view of the stability in the polymerization, and n3 is preferably 0 or 1. In order to make the fluorosurfactant less likely to remain during processing of the resulting PTFE aqueous dispersion, M is preferably NH$_4$.

The perfluoropolyether carboxylic acid (III) is preferably C$_4$F$_9$OCF(CF$_3$)COOM, C$_3$F$_7$OCF(CF$_3$)COOM, C$_2$F$_5$OCF(CF$_3$)COOM, CF$_3$OCF(CF$_3$)COOM, or CF$_3$OCF(CF$_3$)CF$_2$OCF(CF$_3$)COOM, where M is defined as mentioned above. For good stability in the polymerization and good removing efficiency, it is more preferably CF$_3$OCF(CF$_3$)COOM or CF$_3$OCF(CF$_3$)CF$_2$OCF(CF$_3$)COOM, where M is defined as mentioned above.

The perfluoroalkyl alkylene carboxylic acid (IV) is represented by the following formula (IV):

$$Rf^2(CH_2)_{n4}Rf^3COOM \quad (IV)$$

wherein Rf$^2$ is a C1-C5 perfluoroalkyl group; Rf$^3$ is a C1-C3 linear or branched perfluoroalkylene group; n4 is an integer of 1 to 3; and M is defined as mentioned above.

In the formula (IV), Rf$^2$ is preferably a perfluoroalkyl group having two or more carbon atoms or a perfluoroalkyl group having four or less carbon atoms. Rf$^3$ is preferably a C1 or C2 perfluoroalkylene group, more preferably —(CF$_2$)— or —CF(CF$_3$)—. Further, n4 is preferably 1 or 2, more preferably 1. In order to make the fluorosurfactant less likely to remain during processing of the resulting PTFE aqueous dispersion, M is preferably NH$_4$.

For example, the perfluoroalkyl alkylene carboxylic acid (IV) is preferably C$_4$F$_9$CH$_2$CF$_2$COOM, C$_3$F$_7$CH$_2$CF$_2$COOM, C$_2$F$_5$CH$_2$CF$_2$COOM, C$_4$F$_9$CH$_2$CF(CF$_3$)COOM, C$_3$F$_7$CH$_2$CF(CF$_3$)COOM, C$_2$F$_5$CH$_2$CF(CF$_3$)COOM, C$_4$F$_9$CH$_2$CH$_2$CF$_2$COOM, C$_3$F$_7$CH$_2$CH$_2$CF$_2$COOM, or C$_2$F$_5$CH$_2$CH$_2$CF$_2$COOM, where M is defined as mentioned above.

The perfluoroalkoxy fluorocarboxylic acid (V) is represented by the following formula (V):

$$Rf^4\text{—}O\text{—}CY^1Y^2CF_2\text{—}COOM \quad (V)$$

wherein Rf$^4$ is a C1-C5 perfluoroalkyl group; Y$^1$ and Y$^2$ may be the same as or different from each other, and are each H or F; and M is defined as mentioned above.

In the formula (V), Rf$^4$ is preferably a C1-C3 perfluoroalkyl group, more preferably a C3 perfluoroalkyl group, in view of the polymerization stability. In order to make the fluorosurfactant less likely to remain during processing of the resulting PTFE aqueous dispersion, M is preferably NH$_4$.

The perfluoroalkoxy fluorocarboxylic acid (V) is preferably C$_3$F$_7$OCH$_2$CF$_2$COOM, C$_3$F$_7$OCHFCF$_2$COOM, or C$_3$F$_7$OCF$_2$CF$_2$COOM, where M is defined as mentioned above.

The perfluoroalkyl sulfonic acid (VI) is represented by the following formula (VI):

$$F(CF_2)_{n5}SO_3M \quad (VI)$$

wherein n5 is an integer of 3 to 6; and M is defined as mentioned above.

In the formula (VI), n5 is preferably an integer of 4 or 5 in view of the polymerization stability. In order to make the fluorosurfactant less likely to remain during processing of the resulting PTFE aqueous dispersion, M is preferably NH$_4$.

For example, the perfluoroalkyl sulfonic acid (VI) is preferably F(CF$_2$)$_4$SO$_3$M or F(CF$_2$)$_5$SO$_3$M, where M is defined as mentioned above.

The perfluoroalkyl alkylene sulfonic acid (VII) is represented by the following formula (VII):

$$Rf^5(CH_2)_{n6}SO_3M \tag{VII}$$

wherein $Rf^5$ is a 1 to 6 perfluoroalkyl group; n6 is an integer of 1 to 3; and M is defined as mentioned above.

In the formula (VII), $Rf^5$ is preferably a C1-C3 perfluoroalkyl group, more preferably a C3 perfluoroalkyl group. Further, n6 is preferably 1 or 2, more preferably 1. In order to make the fluorosurfactant less likely to remain during processing of the resulting PTFE aqueous dispersion, M is preferably $NH_4$.

For example, the perfluoroalkyl alkylene sulfonic acid (VII) is preferably $C_3F_7CH_2SO_3M$ or $C_6F_{13}(CH_2)_2SO_3M$, where M is defined as mentioned above. For good stability in the polymerization and good removing efficiency, it is more preferably $C_3F_7CH_2SO_3M$ where M is defined as mentioned above.

The fluorosurfactant having Log POW of 3.4 or lower is preferably at least one selected from the group consisting of: fluorine-containing compounds represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group); the ω-H perfluorocarboxylic acids (II) represented by the formula (II); the perfluoropolyether carboxylic acids (III) represented by the formula (III); the perfluoroalkyl alkylene carboxylic acids (IV) represented by the formula (IV); the perfluoroalkoxy fluorocarboxylic acids (V) represented by the formula (V); and the perfluoroalkyl alkylene sulfonic acid (VII) represented by the formula (VII).

The fluorosurfactant having Log POW of 3.4 or lower is more preferably at least one selected from the group consisting of: the fluorine-containing compounds represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group); fluorine-containing compounds represented by the following formula (3):

$$CF_3OCF(CF_3)CF_2OCF(CF_3)COOX \tag{3}$$

(wherein X is a hydrogen atom, $NH_4$, or an alkali metal atom); fluorine-containing compounds represented by the following formula (4):

$$CF_3CF_2OCF_2CF_2OCF_2COOX \tag{4}$$

(wherein X is a hydrogen atom, $NH_4$, or an alkali metal atom); and fluorine-containing compounds represented by the following formula (5):

$$CF_3OCF_2CF_2OCF_2COOX \tag{5}$$

(wherein X is a hydrogen atom, $NH_4$, or an alkali metal atom).

The fluorosurfactant having Log POW of 3.4 or lower is still more preferably a fluorine-containing compound represented by the following formula (1):

$$X—(CF_2)_{m1}—Y \tag{1}$$

(wherein X is H or F; m1 is an integer of 3 to 5; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group).

The polytetrafluoroethylene aqueous dispersion of the present invention preferably does not contain a fluorine-containing compound represented by the following formula (2):

$$X—(CF_2)_{m2}—Y \tag{2}$$

wherein X is H or F; m2 is an integer of 6 or greater; and Y is $—SO_3M$, $—SO_4M$, $—SO_3R$, $—SO_4R$, $—COOM$, $—PO_3M_2$, or $—PO_4M_2$, where M is H, $NH_4$, or an alkali metal and R is a C1-C12 alkyl group.

The polytetrafluoroethylene aqueous dispersion of the present invention is excellent in dispersion stability even without such a conventional long-chain fluorosurfactant.

The PTFE aqueous dispersion of the present invention may have a solid content of 1 to 70 mass %. Still, a low solid content may cause disadvantageous productivity, and thus the solid content is preferably 5 to 60 mass %.

The lower limit of the solid content of the PTFE aqueous dispersion of the present invention is more preferably 10 mass %, still more preferably 15 mass %, further more preferably 20 mass %, particularly preferably 25 mass %, most preferably 30 mass %.

The upper limit of the solid content of the PTFE aqueous dispersion of the present invention is more preferably 50 mass %, still more preferably 40 mass %.

The solid content herein is determined as follows. Specifically, 1 g of the aqueous dispersion is dried in a forced air oven at 300° C. for 60 minutes, and the proportion (in terms of percentage) of the mass of residue after heating relative to the mass (1 g) of the aqueous dispersion is defined as the solid content.

The PTFE aqueous dispersion of the present invention preferably satisfies that the precipitation amount of the PTFE particles in the PTFE aqueous dispersion having a solid content of the PTFE particles of 5.0 mass % is not more than 10.0 mass %, more preferably not more than 7.0 mass %, still more preferably not more than 5.5 mass %, particularly preferably not more than 3.0 mass %. The lower limit thereof may be any value.

The "precipitation amount of the PTFE particles" herein can be measured as follows, for example. First, 30 g of the PTFE aqueous dispersion maintained at 25° C. is put in a container for exclusive use, and then stirred at 5000 rpm for five minutes using a centrifuge (himac CT15D, Hitachi Koki Co., Ltd.) equipped with a rotor (RT15A7 model), separating the precipitation layer and the PTFE aqueous dispersion layer. The PTFE aqueous dispersion layer is isolated and the solid content is determined. The precipitation amount is then calculated from the difference between the solid content in the PTFE aqueous dispersion layer and the original solid content in the PTFE aqueous dispersion used. The precipitation amount is determined in terms of proportion (mass %) relative to the amount of the PTFE contained in the PTFE aqueous dispersion used. The lower the proportion is, the better the storage stability is.

The PTFE aqueous dispersion of the present invention preferably satisfies that the mesh-up amount of the PTFE particles in the PTFE aqueous dispersion having a solid content of the PTFE particles of 5.0 mass % is not more than 2.5 mass %, more preferably not more than 2.0 mass %, still more preferably not more than 1.8 mass %, particularly preferably not more than 1.3 mass %. The lower limit thereof may be any value.

The "mesh-up amount of the PTFE particles" herein can be determined as follows, for example. First, 100 g of the PTFE aqueous dispersion maintained at 65° C. is circulated for two hours at a discharge flow rate of 10 L/h using a peristaltic pump (roller pump RP-2000, Tokyo Rikakikai Co, Ltd.) equipped with a tube (Tygon tube) having an inner diameter of 4.76 mm and an outer diameter of 7.94 mm. Then, the aqueous dispersion is filtered through a 200-mesh stainless steel net. The amount of the substance remaining on the net is measured in terms of proportion (mass %) relative to the amount of the PTFE contained in the PTFE aqueous dispersion used. The lower the proportion is, the better the mechanical stability is.

The PTFE aqueous dispersion of the present invention may be produced by, for example, a method including emulsion polymerizing tetrafluoroethylene alone or tetrafluoroethylene and a modifying monomer copolymerizable with the tetrafluoroethylene in an aqueous medium in the presence of a fluorosurfactant having Log POW of 3.4 or lower and a polymerization initiator, wherein the fluorosurfactant is used in an amount corresponding to 4,600 to 500,000 ppm of the aqueous medium.

The above method can provide an aqueous dispersion that contains PTFE particles having a significantly small particle size and has excellent dispersion stability by the use of a large amount of a specific fluorosurfactant.

The above method provides an aqueous dispersion containing PTFE particles by emulsion polymerizing a fluoromonomer in an aqueous medium in the presence of a fluorosurfactant having Log POW of 3.4 or lower and a polymerization initiator.

The fluorosurfactant having Log POW of 3.4 or lower may be any of the aforementioned compounds.

The amount of the fluorosurfactant used in the above method corresponds to 4,600 to 500,000 ppm of the aqueous medium. Too small an amount of the fluorosurfactant may fail to give an aqueous dispersion containing PTFE particles having a small volume average particle size. Too large an amount thereof may fail to give the effects corresponding to the amount, causing economic disadvantages. The amount of the fluorosurfactant is preferably 6,000 ppm or more, more preferably 8,000 ppm or more, still more preferably 18,000 ppm or more, particularly preferably 20,000 ppm or more, while preferably 400,000 ppm or less, more preferably 300,000 ppm or less.

The polymerization initiator used in the above method may be any initiator capable of generating radicals within the above range of the polymerization temperature, and any known oil-soluble and/or water-soluble polymerization initiator can be used. Further, the initiator may be combined with a reducing agent to form a redox agent, for example, to start the polymerization. The concentration of the polymerization initiator can appropriately be determined in accordance with the types of the monomers, the target molecular weight of a polymer, and the reaction rate.

The polymerization initiator is preferably at least one selected from the group consisting of persulfates and organic peroxides. In order to achieve good dispersion stability of the PTFE particles in the aqueous dispersion, the polymerization initiator may be any of persulfates such as ammonium persulfate and potassium persulfate and water-soluble organic peroxides such as disuccinic acid peroxide and diglutamic acid peroxide. Considering the handleability and the cost, ammonium persulfate is preferred.

The amount of the polymerization initiator can be appropriately determined in accordance with the MFR of the target PTFE. The amount of the polymerization initiator is usually 2 to 500 ppm relative to the whole amount of the aqueous medium. The upper limit thereof is more preferably 300 ppm, still more preferably 100 ppm. In order to achieve good dispersion stability of the PTFE particles in the aqueous dispersion, the amount of the polymerization initiator is preferably an amount corresponding to 2 ppm or more of the aqueous medium.

The aqueous medium used in the above method is a reaction medium in which the polymerization proceeds, and is a liquid that contains water. The aqueous medium may be any medium that contains water, and it may be one containing water and, for example, any of fluorine-free organic solvents such as alcohols, ethers, and ketones, and/or fluorinated organic solvents having a boiling point of 40° C. or lower.

The emulsion polymerization in the above method may be performed in the presence of a chain-transfer agent. The chain-transfer agent may be a known one. Examples thereof include saturated hydrocarbons such as methane, ethane, propane, and butane; halogenated hydrocarbons such as chloromethane, dichloromethane, and difluoroethane; alcohols such as methanol and ethanol; and hydrogen. The chain-transfer agent is preferably one which is in the gas state at room temperature and atmospheric pressure, and more preferably ethane or propane.

The amount of the chain-transfer agent is usually 1 to 50,000 ppm, preferably 1 to 20,000 ppm, relative to the whole amount of the fluoromonomer supplied. The upper limit thereof is more preferably 10,000 ppm, still more preferably 7,000 ppm, whereas the lower limit thereof is more preferably 50 ppm, still more preferably 100 ppm.

Use of a large amount of the fluorosurfactant and a small amount of the chain-transfer agent is also one preferred condition of the above method. Such a condition enables easy production of PTFE particles having a high molecular weight and a small particle size.

A particularly preferred condition is to use 6,000 ppm or more of the fluorosurfactant and 20,000 ppm or less of the chain-transfer agent. In such a preferred condition, the amount of the fluorosurfactant is more preferably 8,000 ppm or more, still more preferably 18,000 ppm or more, particularly preferably 20,000 ppm or more, while preferably 400,000 ppm or less, more preferably 300,000 ppm or less. The amount of the chain-transfer agent is more preferably 10,000 ppm or less, still more preferably 7,000 ppm or less, while preferably 50 ppm or more, more preferably 100 ppm or more.

The chain-transfer agent may be added to a reactor at one time before the start of the polymerization, may be added in portions during the polymerization, or may continually be added during the polymerization.

In the emulsion polymerization, a stabilizer may be added. Preferred examples of the stabilizer include paraffin wax (hydrocarbons having 16 or more carbon atoms), fluorine-based oils, fluorine-based compounds, and silicone oil, and particularly preferred is paraffin wax. The melting point of the paraffin wax is usually preferably 40° C. to 65° C. Emulsion polymerization in an aqueous medium containing such a stabilizer inhibits coagulation of emulsified particles generated in the polymerization system, providing more stable emulsified particles.

In order to emulsifying PTFE more stably, the amount of the paraffin wax is preferably 0.1 to 12 parts by mass relative to 100 parts by mass of the aqueous medium. The lower limit of the amount is more preferably 1 part by mass and the upper limit thereof is more preferably 8 parts by mass, relative to 100 parts by mass of the aqueous medium.

The emulsion polymerization is preferably performed at 10° C. to 95° C., more preferably not lower than 30° C. but not higher than 90° C.

The emulsion polymerization is preferably performed at 0.05 to 3.9 MPaG, more preferably not lower than 0.1 MPaG but not higher than 3.0 MPaG.

The emulsion polymerization is performed as follows. Specifically, a fluoromonomer is put into a polymerization reactor. The contents of the reactor are stirred and the temperature in the reactor is maintained at a predetermined polymerization temperature. A polymerization initiator is added to the reactor to initiate the polymerization reaction. If necessary, components such as an aqueous medium and additives may be put into the reactor before the start of the polymerization reaction. The fluoromonomer, the polymerization initiator, and the chain-transfer agent may additionally be added in accordance with the respective purposes after the start of the polymerization reaction.

The emulsion polymerization in the above method is preferably performed in the absence of a fluorine-containing compound represented by the following formula (2):

$$X-(CF_2)_{m2}-Y \qquad (2)$$

wherein X is H or F; m2 is an integer of 6 or greater; and Y is $-SO_3M$, $-SO_4M$, $-SO_3R$, $-SO_4R$, $-COOM$, $-PO_3M_2$ or $-PO_4M_2$ where M is H, $NH_4$, or an alkali metal and R is a C1-C12 alkyl group. The above method can provide an aqueous dispersion containing PTFE particles having a sufficiently small volume average particle size even without such a conventional long-chain fluorosurfactant.

The PTFE aqueous dispersion of the present invention contains PTFE particles having a significantly small particle size. Thus, if the aqueous dispersion is subjected to multistage polymerization, such multistage polymerization can provide an aqueous dispersion which contains fluororesin particles each having a core-shell structure whose core portion is formed from the PTFE particle and having a significantly small particle size.

Further, a PTFE aqueous dispersion containing no fluorosurfactant and having a high solid content can be produced by performing a step (I) of bringing the PTFE aqueous dispersion produced by the production method of the present invention into contact with an ion exchange resin in the presence of a nonionic surfactant and a step (II) of condensing the aqueous dispersion produced in the step (I) such that the solid content in the aqueous dispersion is adjusted to 30 to 70 mass % relative to 100 mass % of the aqueous dispersion.

The solid content of the condensed PTFE aqueous dispersion is determined as follows. Specifically, 1 g of the aqueous dispersion is dried in a forced air oven at 300° C. for 60 minutes, and the proportion (in terms of percentage) of the mass of residue after heating relative to the mass (1 g) of the aqueous dispersion is defined as the solid content.

The step of bringing the aqueous dispersion into contact with an ion exchange resin may be performed by a conventionally known method. The condensing method may be as mentioned above, for example.

The PTFE aqueous dispersion of the present invention is preferably collected by separating the PTFE aqueous dispersion and the ion exchange resin after the step (I).

The nonionic surfactant may be any known fluorine-free nonionic compound. Examples of the nonionic surfactant include: ether-type nonionic surfactants such as polyoxyethylene alkyl phenyl ethers, polyoxyethylene alkyl ethers, and polyoxyethylene alkylene alkyl ethers; polyoxyethylene derivatives such as ethylene oxide/propylene oxide block copolymers; ester-type nonionic surfactants such as sorbitan fatty acid esters, polyoxyethylene sorbitan fatty acid esters, polyoxyethylene sorbitol fatty acid esters, glycerin fatty acid esters, and polyoxyethylene fatty acid esters; and amine-type nonionic surfactants such as polyoxyethylene alkylamines and alkyl alkanolamides. These surfactants are non-fluorinated nonionic surfactants.

The hydrophobic group in the compound constituting the nonionic surfactant may be any of alkyl phenol groups, linear alkyl groups, and branched alkyl groups, and is preferably a compound free from a benzene ring, such as a compound having no alkyl phenol group in the structure.

The nonionic surfactant is particularly preferably a polyoxyethylene alkyl ether. The polyoxyethylene alkyl ether is preferably one having a polyoxyethylene alkyl ether structure with a C10-C20 alkyl group, more preferably one having a polyoxyethylene alkyl ether structure with a C10-C15 alkyl group. The alkyl group in the polyoxyethylene alkyl ether structure preferably has a branched structure.

Examples of commercially available products of the polyoxyethylene alkyl ether include Genapol X080 (trade name, Clariant), TERGITOL 9-S-15 (trade name, Clariant), NOIGEN TDS-80 (trade name, DKS Co., Ltd.), and LEOCOL TD-90 (trade name, Lion Corp.).

The above aqueous dispersion can provide PTFE powder.

Examples of the PTFE constituting the PTFE aqueous dispersion include the same PTFE mentioned with regard to the PTFE aqueous dispersion of the present invention.

The PTFE powder preferably has an average particle size (average secondary particle size) of 0.1 to 700 μm. The average particle size of the PTFE powder is preferably 0.5 μm or greater.

The average particle size is considered to be equal to a value corresponding to a value of 50% of the cumulative volume in the particle size distribution determined using a laser diffraction type particle size distribution analyzer (for example, a product from JEOL Ltd.) at a pressure of 0.1 MPa and a measurement time of three seconds without cascade impaction.

The PTFE powder may be produced by, for example, coagulating the PTFE aqueous dispersion of the present invention. Examples of common methods of coagulating the PTFE aqueous dispersion include methods of coagulating emulsified particles by freezing or mechanical shearing. In order to reduce the amount of a polymer remaining in the water phase after the coagulation, an electrolyte such as nitric acid, sulfuric acid, or ammonium nitrate is preferably added as a coagulating agent to the aqueous dispersion before the coagulation. If an acid is used as the electrolyte, the aqueous phase and the coagulated particles are preferably neutralized with an alkali such as sodium hydroxide or potassium hydroxide after the coagulation.

Then, in order to remove the fluorosurfactant, the coagulated particles are usually further washed with pure water. For an increased removing efficiency, the washing is preferably repeated multiple times.

The coagulation and the washing of the coagulated particles are followed by drying. Thereby, PTFE powder can be obtained.

The PTFE powder can be suitably used as fine powder.

The PTFE aqueous dispersion and the PTFE powder can suitably be used as, for example, additives for modifying molding materials, inks, cosmetics, coating materials, grease, parts of office automation devices, and toners; and additives for plating solutions. Examples of the molding materials include engineering plastics such as polyoxybenzoyl polyester, polyimide, polyamide, polyamide-imide, polyacetal, polycarbonate, and polyphenylene sulfide.

The PTFE aqueous dispersion and the PTFE powder can suitably be used as additives for molding materials for the purposes of, for example, improving non-stickiness and sliding properties of rollers for copying devices; improving the texture of engineering plastic molded products, such as surface sheets of furniture, dashboard of automobiles, and covers of consumer electrical appliances; and improving the smoothness and abrasion resistance of machine parts generating mechanical friction, such as light-load bearings, gears, cams, buttons of touch-tone phones, movie projectors, camera parts, and sliding parts. Also, they can suitably be used as processing aids for engineering plastics.

The PTFE aqueous dispersion and the PTFE powder can be used as additives for coating materials for the purpose of improving the smoothness of varnish and paint. The PTFE aqueous dispersion and the PTFE powder can be used as additives for cosmetics for the purpose of, for example, improving the smoothness of cosmetics such as foundation.

The PTFE aqueous dispersion and the PTFE powder can also be suitably used for the purpose of improving the oil or water repellency of articles such as wax and of improving the smoothness of grease and toners.

The PTFE aqueous dispersion and the PTFE powder can also be used as, for example, electrode binders for secondary batteries and fuel cells, hardness adjusters for electrode binders, and water-repellents for electrode surfaces. The PTFE aqueous dispersion is more suitable for this use than the PTFE powder in many cases.

EXAMPLES

Next, the present invention is described below referring to, but not limited to, examples.

The values in the examples are determined as follows.
(Volume Average Particle Size)

The volume average particle size is determined by dynamic light scattering (DLS). The dynamic light scattering (DLS) measurement was performed using ELSZ-1000S (Otsuka Electronics Co., Ltd.) at 25° C. A PTFE aqueous dispersion having a PTFE solid content of 1.0 mass % was used as a sample. The applied refractive index of the solvent (water) was 1.3328 and the viscosity of the solvent (water) was 0.8878 mPa·s. The measurement was performed using 660-nm laser as a light source and the light scattered from the sample was detected at 165° which is close to the backscattering angle. One measurement included 70 accumulations, and the data was imported over about 3 minutes. In accordance with the scattering intensity of the sample, the device automatically adjusted the intensity of the laser light applied to the sample and the position of measurement so as to give an optimal scattering intensity (10000 to 50000 cps).

Based on the resulting autocorrelation function, the ELSZ-1000 software provided the average particle size (d) and the polydispersity index (PI) by the Cumulant method adapted to the autocorrelation function. Still, the information regarding the particle size distribution is insufficient.

Thus, in order to obtain the particle size distribution, the histogram method was performed in which approximation is performed by causing a limited number of Γj to represent the distribution. The non-linear least squares method used in the approximation was a modified Marquardt method. The resulting particle size distribution is a distribution dependent to the scattering intensity, and thus converted into a weight distribution by the Rayleigh-Gans-Debye function. The average value in the weight distribution was defined as the weight average particle size. The specific gravity of the particles in the sample is identical regardless of the particle size. Thus, the weight average particle size is considered as equivalent to the volume average particle size.
(Melt Flow Rate (MFR))

The MFR was determined as the mass (g/10 min) of the polymer flowed out of a nozzle (inner diameter: 2 mm, length: 8 mm) per 10 minutes using a melt indexer (Yasuda Seiki Seisakusho Ltd.) in conformity with ASTM D1238 at 380° C. and 5 kg load.

If the amount of the polymer flowed out was a very slight amount and was difficult to measure, it was regarded as 0.2 g/10 min or less.
(Modified Amount)

The modified amount was determined by appropriate combination of NMR, FT-IR, elemental analysis, and X-ray fluorescence analysis in accordance with the type of the monomer.
(Melting Point)

The melting point was determined as a temperature corresponding to the local maximum on a heat-of-fusion curve obtained by heating 3 mg of a sample having no history of being heated up to 300° C. or higher using a differential scanning calorimeter (DSC) at a temperature-increasing rate of 10° C./min.
(Initial Pyrolysis Temperature)

The initial pyrolysis temperature was determined as a temperature at which the amount of a sample was reduced by 1 mass % when 10 mg of the sample was heated from room temperature at a temperature-increasing rate of 10° C./min using a thermogravimetric-differential thermal analysis (TG-DTA) device (trade name: TG/DTA6200, Seiko Instruments Inc.).
(Solid Content)

The solid content of the pre-condensation aqueous dispersion obtained by polymerization was a value corresponding to the proportion (in terms of percentage) of the mass of residue after heating (which was prepared by drying 1 g of the aqueous dispersion in a forced air oven at 300° C. for 60 minutes) relative to the mass (1 g) of the aqueous dispersion.

The solid content of the condensed PTFE aqueous dispersion was a value corresponding to the proportion (in terms of percentage) of the mass of residue after heating (which was prepared by drying 1 g of the aqueous dispersion in a forced air oven at 300° C. for 60 minutes) relative to the mass (1 g) of the aqueous dispersion.
(Evaluation of Dispersion Stability)
(Storage Stability Test)

First, 30 g of the PTFE aqueous dispersion maintained at 25° C. was put in a container for exclusive use, and then stirred at 5000 rpm for five minutes using a centrifuge (himac CT15D, Hitachi Koki Co., Ltd.) equipped with a rotor (RT15A7 model), separating the precipitation layer and the PTFE aqueous dispersion layer. The PTFE aqueous dispersion layer was isolated and the solid content was determined. The precipitation amount was then calculated from the difference between the solid content in the PTFE aqueous dispersion layer and the original solid content in the PTFE aqueous dispersion used. The precipitation amount was determined in terms of proportion (mass %) relative to the amount of the PTFE contained in the PTFE aqueous dispersion used. The lower the proportion is, the better the storage stability is.
(Mechanical Stability Test)

First, 100 g of the PTFE aqueous dispersion maintained at 65° C. was circulated for two hours at a discharge flow rate of 10 L/h using a peristaltic pump (roller pump RP-2000, Tokyo Rikakikai Co, Ltd.) equipped with a tube (Tygon tube) having an inner diameter of 4.76 mm and an outer diameter of 7.94 mm. Then, the PTFE aqueous dispersion was filtered through a 200-mesh stainless steel net. The amount of the substance remaining on the net was measured in terms of proportion (mass %) relative to the amount of the PTFE contained in the PTFE aqueous dispersion used. The lower the proportion is, the better the mechanical stability is.

Example 1

A 1-L glass reactor equipped with a stirrer was charged with 530 g of deionized water, 30 g of paraffin wax, and 49.5 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas was added to the reactor, and the contents were stirred at 540 rpm. The TFE monomer was added to the reactor until the inner pressure reached 0.73 MPaG. An initiator prepared by dissolving 0.110 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to maintain the pressure, and the polymerization was continued until about 140 g of the TFE monomer was consumed in the reaction. Thereafter, the gas in the reactor was discharged until the pressure reached normal pressure. The contents were then taken out of the reactor and cooled down. The supernatant paraffin wax was removed from the resulting PTFE aqueous dispersion.

The resulting PTFE aqueous dispersion had a solid content of 20.9 mass % and a volume average particle size of 1.2 nm.

Nitric acid was added to the resulting PTFE aqueous dispersion, and the mixture was vigorously stirred until coagulation occurred. The resulting coagulum was washed with deionized water, and then dried at 150° C. Thereby, PTFE powder was obtained. This PTFE powder had a MFR of 16.7 g/10 min, a melting point of 327.2° C., and an initial pyrolysis temperature at 1 mass % of 473.0° C.

Deionized water was added to the resulting PTFE aqueous dispersion to adjust the solid content to 5.0 mass %, and the storage stability thereof was evaluated. The precipitation amount was 0.1 mass %.

APFH, which is the same dispersant as used in the polymerization, was added to the PTFE aqueous dispersion to adjust the amount of the dispersant to 10.0 mass %. Deionized water was further added to the dispersion to adjust the solid content to 5.0 mass %, and the mechanical stability was evaluated. The mesh-up amount was 0.1 mass %.

Then, 100 g of the resulting PTFE aqueous dispersion was uniformly mixed with 2.0 g of a nonionic surfactant having a cloud point of 60° C., and the mixture was passed through a column filled with an ion exchange resin. The resulting aqueous dispersion was maintained at 60° C., and the condensed phase provided by phase separation was collected. This condensed phase had a solid content of 62 mass %. Water and a surfactant were further added to the condensed phase to give a solid content of 60 mass % and a surfactant content of 8 mass %, and the pH was adjusted to 9.7.

Example 2

The polymerization was performed in the same manner as in Example 1 except that the polymerization temperature was not 85° C. as in Example 1 but 70° C.

Example 3

The polymerization was performed in the same manner as in Example 1 except that the amount of the ammonium persulfate (APS) initiator was not 0.110 g as in Example 1 but 0.028 g.

Example 4

The polymerization was performed in the same manner as in Example 1 except that the amount of the ammonium persulfate (APS) initiator was not 0.110 g as in Example 1 but 0.006 g, the amount of the ammonium perfluorohexanoate (APFH) dispersant was not 49.5 g but 55.0 g, and the polymerization was continued until about 40 g of the TFE monomer was consumed in the reaction.

Example 5

The polymerization was performed in the same manner as in Example 1 except that the amount of the ammonium persulfate (APS) initiator was not 0.110 g as in Example 1 but 0.006 g, the amount of the ammonium perfluorohexanoate (APFH) dispersant was not 49.5 g but 27.5 g, and the polymerization was continued until about 10 g of the TFE monomer was consumed in the reaction.

Example 6

The polymerization was performed in the same manner as in Example 4 except that the amount of the ammonium perfluorohexanoate (APFH) dispersant was not 55.0 g as in Example 4 but 26.4 g.

Example 7

The polymerization was performed in the same manner as in Example 4 except that the amount of the ammonium perfluorohexanoate (APFH) dispersant was not 55.0 g as in Example 4 but 25.9 g.

Example 8

The polymerization was performed in the same manner as in Example 4 except that 55.0 g of the ammonium perfluorohexanoate (APFH) dispersant as in Example 4 was replaced by 20.9 g of an ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant.

Example 9

The polymerization was performed in the same manner as in Example 8 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 20.9 g as in Example 8 but 13.8 g.

Example 10

The polymerization was performed in the same manner as in Example 8 except that the amount of the ammonium 2,3,3,3-tetrafluoro-2-[1,1,2,3,3,3-hexafluoro-2-(trifluoromethoxy)propoxy]-propanoate (CF$_3$OCF(CF$_3$)CF$_2$OCF(CF$_3$)COONH$_4$) (PMPA) dispersant was not 20.9 g as in Example 8 but 10.5 g.

Example 11

A 6-L stainless steel reactor equipped with a stirrer was charged with 2860 g of deionized water, 104 g of paraffin wax, and 288.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.08 g of ethane gas was added to the reactor, and the contents were stirred at 250 rpm. The TFE monomer was added to the reactor until the inner pressure reached 0.25 MPaG. An initiator prepared by dissolving 0.029 g of ammonium persulfate (APS) in 20 g of deionized water was charged into the reactor, and the pressure in the reactor was adjusted to 0.30 MPaG. The charging of the initiator was followed by a decrease in the pressure, which means that the start of the polymerization was observed. The TFE monomer was added to the reactor to maintain the pressure, and the polymerization was continued until about 250 g of the TFE monomer was consumed in the reaction. Thereafter, the gas in the reactor was discharged until the pressure reached normal pressure. The contents were then taken out of the reactor and cooled down. The supernatant paraffin wax was removed from the resulting PTFE aqueous dispersion.

The resulting PTFE aqueous dispersion had a solid content of 6.0 mass % and a volume average particle size of 2.5 nm.

A portion of the resulting PTFE aqueous dispersion was frozen in a freezer. The frozen PTFE aqueous dispersion was left to stand until the temperature reached 25° C., and thereby a coagulated powder was obtained. The wet coagulated powder was washed with deionized water and then dried at 150° C. This PTFE powder had a MFR of 0.2 g/10 min or lower, a melting point of 329.5° C., and an initial pyrolysis temperature at 1 mass % of 490.8° C.

Example 12

The polymerization was performed in the same manner as in Example 11 except that 0.08 g of the ethane gas as in Example 11 was replaced by 0.10 g of PMVE.

Example 13

The polymerization was performed in the same manner as in Example 11 except that 0.08 g of the ethane gas as in Example 11 was replaced by 0.49 g of HFP, the reactor at a pressure of 0.30 MPaG was replaced by a reactor at a pressure of 0.20 MPaG, and the polymerization was continued until about 200 g of the TFE monomer was consumed in the reaction.

Example 14

The polymerization was performed in the same manner as in Example 4 except that 0.03 g of the ethane gas as in Example 4 was replaced by 0.41 g of PPVE.

Example 15

A 1-L glass reactor equipped with a stirrer was charged with 530 g of deionized water, 30 g of paraffin wax, and 55.0 g of an ammonium perfluorohexanoate (APFH) dispersant. Next, the contents of the reactor were heated up to 85° C. and sucked, and simultaneously the reactor was purged with a TFE monomer, thereby removing the oxygen in the reactor. Then, 0.03 g of ethane gas and 0.20 g of perfluorohexylethylene (PFHE) were added to the reactor, and the contents were stirred at 540 rpm. The TFE monomer was added to the reactor until the inner pressure reached 0.73 MPaG. An initiator prepared by dissolving 0.006 g of ammonium persulfate (APS) in 20 g of deionized water was charged into the reactor, and the pressure in the reactor was adjusted to 0.83 MPaG. The charging of the initiator was followed by a decrease in the pressure, which means that the start of the polymerization was observed. The TFE monomer was added to the reactor to maintain the pressure, and the polymerization was continued until about 40 g of the TFE monomer was consumed in the reaction. Thereafter, the gas in the reactor was discharged until the pressure reached normal pressure. The contents were then taken out of the reactor and cooled down. The supernatant paraffin wax was removed from the resulting PTFE aqueous dispersion.

The resulting PTFE aqueous dispersion had a solid content of 6.6 mass % and a volume average particle size of 1.6 nm.

A portion of the resulting PTFE aqueous dispersion was frozen in a freezer. The frozen PTFE aqueous dispersion was left to stand until the temperature reached 25° C., and thereby a coagulated powder was obtained. The wet coagulated powder was washed with deionized water, and then dried at 150° C. This PTFE powder had a MFR of 0.2 g/10 min or lower, a melting point of 329.3° C., and an initial pyrolysis temperature at 1 mass % of 465.5° C.

Example 16

The polymerization was performed in the same manner as in Example 15 except that the polymerization temperature was not 85° C. as in Example 15 but 70° C., the amount of the ammonium persulfate (APS) initiator was not 0.006 g but 0.110 g, the amount of the ammonium perfluorohexanoate (APFH) dispersant was not 55.0 g but 44.0 g, 0.20 g of the perfluorohexylethylene (PFHE) was replaced by 1.12 g of perfluoro[3-(1-methyl-2-vinyloxy-ethoxy)propionitrile] (CNVE), and the polymerization was continued until about 140 g of the TFE monomer was consumed in the reaction.

Example 17

The polymerization was performed in the same manner as in Example 16 except that 44.0 g of the ammonium perfluorohexanoate (APFH) dispersant as in Example 16 was replaced by 22.0 g of an ammonium 2,3,3,3-tetrafluoro-2-[1,1,2,3,3,3-hexafluoro-2-(trifluoromethoxy)propoxy]-propanoate (CF$_3$OCF(CF$_3$)CF$_2$OCF(CF$_3$)COONH$_4$) (PMPA) dispersant.

Example 18

The polymerization was performed in the same manner as in Example 15 except that 0.20 g of the perfluorohexyl ethylene (PFHE) as in Example 15 was replaced by 0.18 g of CTFE.

Example 19

The polymerization was performed in the same manner as in Example 16 except that the amount of the ammonium persulfate (APS) initiator was not 0.110 g as in Example 16 but 1.100 g.

Example 20

The polymerization was performed in the same manner as in Example 16 except that 44.0 g of the ammonium perfluorohexanoate (APFH) dispersant as in Example 16 was replaced by 33.0 g of a perfluoropolyether alkyl acid ammonium salt dispersant ($C_3F_7OCF(CF_3)COONH_4$) (PFPE).

Example 21

The polymerization was performed in the same manner as in Example 4 except that 55.0 g of the ammonium perfluorohexanoate (APFH) dispersant as in Example 4 was replaced by 100.0 g of an ammonium perfluoropentanoate (APFP) dispersant and the polymerization was continued until about 140 g of the TFE monomer was consumed in the reaction.

Example 22

The polymerization was performed in the same manner as in Example 4 except that 55.0 g of the ammonium perfluorohexanoate (APFH) dispersant as in Example 4 was replaced by 7.7 g a perfluoroalkyl alkylene sulfonic acid dispersant ($C_6F_{13}(CH_2)_2SO_3H$) (6,2-PFAS).

Example 23

The polymerization was performed in the same manner as in Example 4 except that 55.0 g of the ammonium perfluorohexanoate (APFH) dispersant as in Example 4 was replaced by 5.0 g a perfluoroalkyl alkylene sulfonic acid dispersant ($C_6F_{13}(CH_2)_2SO_3H$) (6,2-PFAS).

Example 24

The polymerization was performed in the same manner as in Example 4 except that 55.0 g of the ammonium perfluorohexanoate (APFH) dispersant as in Example 4 was replaced by 3.9 g of a perfluoroalkyl alkylene sulfonic acid dispersant ($C_6F_{13}(CH_2)_2SO_3H$) (6,2-PFAS).

Comparative Example 1

The polymerization was performed in the same manner as in Example 8 except that the amount of the ammonium 2,3,3,3-tetrafluoro-2-[1,1,2,3,3,3-hexafluoro-2-(trifluoromethoxy)propoxy]-propanoate ($CF_3OCF(CF_3)CF_2OCF(CF_3)COONH_4$) (PMPA) dispersant was not 20.9 g as in Example 8 but 8.8 g.

Table 1 and Table 2 show the polymerization conditions and the evaluation results on the PTFE aqueous dispersions in the respective examples.

TABLE 1

| | Temperature °C. | Pressure MPaG | Initiator Type | Initiator Amount ppm | Emulsifier Type | Emulsifier Amount ppm | Modifier Type | Modifier Amount g | Chain-transfer agent Type | Chain-transfer agent Amount ppm |
|---|---|---|---|---|---|---|---|---|---|---|
| Example 1 | 85 | 0.83 | APS | 200 | APFH | 90,000 | — | — | Ethane | 206 |
| Example 2 | 70 | 0.83 | APS | 200 | APFH | 90,000 | — | — | Ethane | 212 |
| Example 3 | 85 | 0.83 | APS | 51 | APFH | 90,000 | — | — | Ethane | 196 |
| Example 4 | 85 | 0.83 | APS | 11 | APFH | 100,000 | — | — | Ethane | 772 |
| Example 5 | 85 | 0.83 | APS | 11 | APFH | 50,000 | — | — | Ethane | 3842 |
| Example 6 | 85 | 0.83 | APS | 11 | APFH | 48,000 | — | — | Ethane | 840 |
| Example 7 | 85 | 0.83 | APS | 11 | APFH | 47,091 | — | — | Ethane | 870 |
| Example 8 | 85 | 0.83 | APS | 11 | PMPA | 38,000 | — | — | Ethane | 683 |
| Example 9 | 85 | 0.83 | APS | 11 | PMPA | 25,091 | — | — | Ethane | 736 |
| Example 10 | 85 | 0.83 | APS | 11 | PMPA | 19,091 | — | — | Ethane | 748 |
| Example 11 | 85 | 0.30 | APS | 10 | APFH | 100,000 | — | — | Ethane | 435 |
| Example 12 | 85 | 0.30 | APS | 10 | APFH | 100,000 | PMVE | 0.10 | — | — |
| Example 13 | 85 | 0.20 | APS | 10 | APFH | 100,000 | HFP | 0.49 | — | — |
| Example 14 | 85 | 0.83 | APS | 11 | APFH | 100,000 | PPVE | 0.41 | — | — |
| Example 15 | 85 | 0.83 | APS | 11 | APFH | 100,000 | PFHE | 0.20 | Ethane | 772 |
| Example 16 | 70 | 0.83 | APS | 200 | APFH | 80,000 | CNVE | 1.12 | Ethane | 210 |
| Example 17 | 70 | 0.83 | APS | 200 | PMPA | 40,000 | CNVE | 1.12 | Ethane | 209 |
| Example 18 | 85 | 0.83 | APS | 11 | APFH | 100,000 | CTFE | 0.18 | Ethane | 798 |
| Example 19 | 70 | 0.83 | APS | 2000 | APFH | 80,000 | CNVE | 1.12 | Ethane | 206 |
| Example 20 | 70 | 0.83 | APS | 200 | PFPE | 60,000 | CNVE | 1.12 | Ethane | 221 |
| Example 21 | 85 | 0.83 | APS | 11 | APFP | 181,818 | — | — | Ethane | 212 |
| Example 22 | 85 | 0.83 | APS | 11 | 6,2-PFAS | 14,000 | — | — | Ethane | 736 |
| Example 23 | 85 | 0.83 | APS | 11 | 6,2-PFAS | 9,091 | — | — | Ethane | 725 |
| Example 24 | 85 | 0.83 | APS | 11 | 6,2-PFAS | 7,091 | — | — | Ethane | 748 |
| Comparative Example 1 | 85 | 0.83 | APS | 11 | PMPA | 16,000 | — | — | Ethane | 736 |

TABLE 2

|  | Volume average particle size nm | MFR g/10 min | Modified amount Type — | Modified amount Amount mol % | Melting point °C. | Initial pyrolysis temperature °C. | Solid content mass % | Dispersion stability* Storage stability (precipitation amount) mass % | Dispersion stability* Mechanical stability (mesh-up amount) mass % |
|---|---|---|---|---|---|---|---|---|---|
| Example 1 | 1.2 | 16.7 | — | — | 327.2 | 473.0 | 20.9 | 0.1 | 0.1 |
| Example 2 | 2.2 | 6.3 | — | — | 328.5 | 477.5 | 20.5 | 0.1 | 0.2 |
| Example 3 | 1.4 | 2.3 | — | — | 329.7 | 486.9 | 21.8 | 0.2 | 0.2 |
| Example 4 | 3.3 | 0.2 or less | — | — | 329.4 | 487.4 | 6.6 | 0.2 | 0.1 |
| Example 5 | 4.7 | 0.4 | — | — | 328.6 | 478.8 | 1.4 | 0.1 | 0.1 |
| Example 6 | 10.7 | 0.2 or less | — | — | 327.6 | 490.1 | 6.1 | 4.3 | 1.5 |
| Example 7 | 19.7 | 0.2 or less | — | — | 327.6 | 489.8 | 5.9 | 7.8 | 2.3 |
| Example 8 | 4.8 | 0.2 or less | — | — | 328.6 | 489.1 | 7.4 | 0.2 | 0.7 |
| Example 9 | 8.9 | 0.2 or less | — | — | 328.6 | 487.3 | 6.9 | 3.7 | 1.4 |
| Example 10 | 15.3 | 0.2 or less | — | — | 328.9 | 491.8 | 6.8 | 6.3 | 1.9 |
| Example 11 | 2.5 | 0.2 or less | — | — | 329.5 | 490.8 | 6.0 | 0.2 | 0.2 |
| Example 12 | 3.4 | 0.2 or less | PMVE | 0.022 | 332.8 | 496.7 | 6.6 | 0.2 | 0.2 |
| Example 13 | 2.2 | 0.2 or less | HFP | 0.133 | 331.8 | 485.3 | 3.9 | 0.2 | 0.2 |
| Example 14 | 1.4 | 0.2 or less | PPVE | 0.23 | 326.7 | 487.9 | 6.7 | 0.1 | 0.2 |
| Example 15 | 1.6 | 0.2 or less | PFHE | 0.144 | 329.3 | 465.5 | 6.6 | 0.1 | 0.2 |
| Example 16 | 1.3 | 0 | CNVE | 0.22 | 330.3 | 463.8 | 20.6 | 0.1 | 0.2 |
| Example 17 | 0.9 | 0 | CNVE | 0.62 | 329.2 | 450.4 | 20.7 | 0.1 | 0.2 |
| Example 18 | 2.8 | 0.2 or less | CTFE | 0.28 | 329.4 | 489.2 | 6.4 | 0.2 | 0.2 |
| Example 19 | 2.6 | 0 | CNVE | 0.16 | 325.9 | 461.7 | 20.9 | 0.2 | 0.2 |
| Example 20 | 2.2 | 0 | CNVE | 0.18 | 328.7 | 466.5 | 19.8 | 0.2 | 0.2 |
| Example 21 | 2.9 | 0.2 or less | — | — | 330.8 | 476.9 | 20.5 | 0.3 | 0.6 |
| Example 22 | 2.7 | 0.2 or less | — | — | 327.5 | 488.1 | 6.9 | 0.3 | 0.5 |
| Example 23 | 4.8 | 0.2 or less | — | — | 327.3 | 473.6 | 7.0 | 2.3 | 0.9 |
| Example 24 | 9.7 | 0.2 or less | — | — | 327.9 | 477.7 | 6.8 | 4.0 | 1.8 |
| Comparative Example 1 | 109.7 | 0.2 or less | — | — | 328.0 | 492.6 | 6.9 | 21.7 | 5.1 |

*Solid content was 1.0 mass % in each of Examples 5 and 13

INDUSTRIAL APPLICABILITY

The polytetrafluoroethylene aqueous dispersion of the present invention contains high-molecular-weight, significantly small polytetrafluoroethylene particles and is excellent in dispersion stability. The PTFE aqueous dispersion can suitably be used as, for example, additives for a variety of molding materials, coating materials, cosmetics, wax, grease, and toners; electrode binders for secondary batteries and fuel cells; hardness adjustors for electrode binders; and water-repellents for electrode surfaces.

The invention claimed is:

1. A polytetrafluoroethylene aqueous dispersion comprising:
   polytetrafluoroethylene particles containing a tetrafluoroethylene unit alone or a tetrafluoroethylene unit and a modifying monomer unit based on said modifying monomer copolymerizable with the tetrafluoroethylene,
   the polytetrafluoroethylene particles having a volume average particle size of not smaller than 0.1 nm but smaller than 20 nm, a melt flow rate of not lower than 0 g/10 min but lower than 80 g/10 min determined at 380° C. and 5 kg load, a melting point of 324° C. to 360° C., and an initial pyrolysis temperature of not lower than 400° C.

2. The polytetrafluoroethylene aqueous dispersion according to claim 1, further comprising a fluorosurfactant in an amount corresponding to 4,600 to 500,000 ppm of the aqueous dispersion.

3. The polytetrafluoroethylene aqueous dispersion according to claim 1, further comprising at least one selected from the group consisting of a fluorine-containing compound represented by the following formula (1):

$$X-(CF_2)_{m1}-Y \qquad (1)$$

wherein X is H or F; m1 is an integer of 3 to 5; and Y is $-SO_3M$, $-OSO_3M$, $SO_3R$, $-OSO_3R$, $-COOM$, $-PO_3M_2$, or $-OPO_3M_2$, where M is H, $NH_4$, or an alkali metal and R is a C1-C12 alkyl group; and a perfluoropolyether carboxylic acid represented by the formula (III):

$$Rf^1-O-(CF(CF_3)CF_2O)_{n3}CF(CF_3)COOM \qquad (III)$$

wherein $Rf^1$ is a C1-C5 perfluoroalkyl group; n3 is an integer of 0 to 3; and M is defined as mentioned above.

4. The polytetrafluoroethylene aqueous dispersion according to claim 1, which is free from a fluorine-containing compound represented by the following formula (2):

$$X-(CF_2)_{m2}-Y \qquad (2)$$

wherein X is H or F; m2 is an integer of 6 or greater; and Y is $-SO_3M$, $-OSO_3M$, $-SO_3R$, $-OSO_3R$, $-COOM$, $-PO_3M_2$, or $-OPO_3M_2$, where M is H, $NH_4$, or an alkali metal and R is a C1-C12 alkyl group.

* * * * *